(12) United States Patent
Kaushal et al.

(10) Patent No.: US 7,918,663 B2
(45) Date of Patent: Apr. 5, 2011

(54) INJECTION MOLDING NOZZLE WEDGE SEAL

(75) Inventors: Hitesh Kaushal, Brampton (CA); Douglas Ursu, Orangeville (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 97 days.

(21) Appl. No.: 12/398,981

(22) Filed: Mar. 5, 2009

(65) Prior Publication Data

US 2010/0227019 A1 Sep. 9, 2010

(51) Int. Cl.
*B29C 45/20* (2006.01)
(52) U.S. Cl. .................... 425/549; 264/328.15
(58) Field of Classification Search .......... 425/549; 264/328.15
See application file for complete search history.

(56) References Cited

U.S. PATENT DOCUMENTS

| | | | |
|---|---|---|---|
| 4,013,393 A | 3/1977 | Gellert | |
| 4,053,271 A | 10/1977 | Gellert | |
| 4,173,448 A | 11/1979 | Rees et al. | |
| 4,268,241 A | 5/1981 | Rees et al. | |
| 4,657,496 A | 4/1987 | Ozeki et al. | |
| 4,662,837 A | 5/1987 | Anderson | |
| 4,663,811 A * | 5/1987 | Gellert | 425/549 |
| 5,374,182 A | 12/1994 | Gessner | |
| 5,411,392 A | 5/1995 | Von Buren | |
| 5,554,395 A | 9/1996 | Hume et al. | |
| 5,820,899 A | 10/1998 | Gellert et al. | |
| 5,879,727 A | 3/1999 | Puri | |
| 6,273,706 B1 | 8/2001 | Gunther | |
| 6,315,549 B1 | 11/2001 | Jenko et al. | |
| 6,428,305 B2 | 8/2002 | Jenko | |
| 6,533,571 B2 | 3/2003 | Fikani | |
| 6,561,790 B2 | 5/2003 | Blais et al. | |
| 7,131,832 B2 | 11/2006 | Babin | |
| 7,134,868 B2 * | 11/2006 | Babin et al. | 425/549 |
| 7,137,807 B2 | 11/2006 | Babin et al. | |
| 7,306,453 B2 | 12/2007 | Spuller et al. | |
| 2003/0075563 A1 | 4/2003 | Bazzo et al. | |
| 2004/0037914 A1 | 2/2004 | Takeuchi et al. | |
| 2007/0178186 A1 | 8/2007 | Goinski | |
| 2008/0092388 A1 | 4/2008 | Bouti | |
| 2008/0093773 A1 | 4/2008 | Schwarzkopf | |

FOREIGN PATENT DOCUMENTS

| | | |
|---|---|---|
| DE | 38 33 220 C2 | 4/1990 |
| JP | 2005-335194 A | 12/2005 |
| JP | 2006-056203 A | 3/2006 |
| WO | WO-2006/042942 A1 | 4/2006 |

OTHER PUBLICATIONS

Int'l Search Report and Written Opinion from Int'l Appl No. PCT/CA2010/000284, May 10, 2010.

* cited by examiner

*Primary Examiner* — Tim Heitbrink
(74) *Attorney, Agent, or Firm* — Medler Ferro PLLC

(57) ABSTRACT

An injection molding apparatus includes an injection molding nozzle having a nozzle body defining a channel for flow of molding material and a nozzle tip coupled to the nozzle body. The nozzle tip is shaped to define a converging gap with a mold component into which the nozzle tip is inserted during use. A seal piece having a wedge or wedge-like portion is disposed between the nozzle tip and the mold component Pressure of molding material acting on a surface of the wedge portion wedges the wedge portion into the converging gap.

27 Claims, 4 Drawing Sheets

INJECTION MOLDING NOZZLE WEDGE SEAL

FIELD OF THE INVENTION

The present invention relates to injection molding, and more particularly, to injection molding nozzles.

BACKGROUND OF THE INVENTION

In many injection molding apparatus designs, seals used with nozzles fail during operation or assembly.

Failure can be of several modes. First, the seal may not seal adequately. If the seal is the primary seal, failure will likely result in downtime. Failure can be a result of poor mating between sealing surfaces, overstress and possible breakage of the seal under high molding pressures, or another cause. Second, the seal may become inadvertently disengaged from the nozzle and so become lost or damaged. During assembly or maintenance, loose seal pieces may fall off nozzles or become lodged inside nozzle wells. Third, the seal may not deliver the thermal characteristic expected. For example, the seal may not meet the demanded thermal insulation for the nozzle tip, resulting in the need to quickly replace the seal with another one.

These and other problems can occur together or separately and are best avoided for smooth injection molding operations.

BRIEF SUMMARY OF THE INVENTION

According to one aspect of the present invention, an injection molding nozzle includes a nozzle body defining a channel for flow of molding material and a nozzle tip coupled to the nozzle body. The nozzle tip is shaped to define a converging gap with a mold component into which the nozzle tip is inserted during use. A seal piece having a wedge or wedge-like portion is disposed between the nozzle tip and the mold component. Pressure of molding material acting on a surface of the wedge portion wedges the wedge portion into the converging gap.

According to another aspect of the present invention, an injection molding nozzle includes a nozzle body defining a channel for flow of molding material and a nozzle tip coupled to the nozzle body. The nozzle tip is shaped to define a converging gap with a mold component into which the nozzle tip is inserted during use. A seal piece is disposed between the nozzle tip and the mold component. The seal piece has a retaining portion that fits onto a cylindrical portion of the nozzle tip to hold the seal piece onto the nozzle tip during assembly. The seal piece further has an annular ring portion having at least two converging surfaces. Pressure of molding material acting on a flow-facing surface of the annular ring portion urges the converging surfaces against surfaces defining the converging gap.

According to another aspect of the present invention, a method of injection molding includes steps of installing a nozzle into a mold, the nozzle including a seal piece having a wedge portion disposed between a nozzle tip and a mold component; injecting pressurized molding material through the nozzle and into a mold cavity defined by the mold; the molding material acting on a surface of the wedge portion to wedge the wedge portion into a converging gap between the nozzle tip and the mold component to seal against leakage of molding material; and opening the mold and ejecting solidified molding material from the mold cavity.

BRIEF DESCRIPTION OF THE FIGURES

Embodiments of the present invention will now be described more fully with reference to the accompanying drawings.

DETAILED DESCRIPTION OF THE INVENTION

Figure 1:
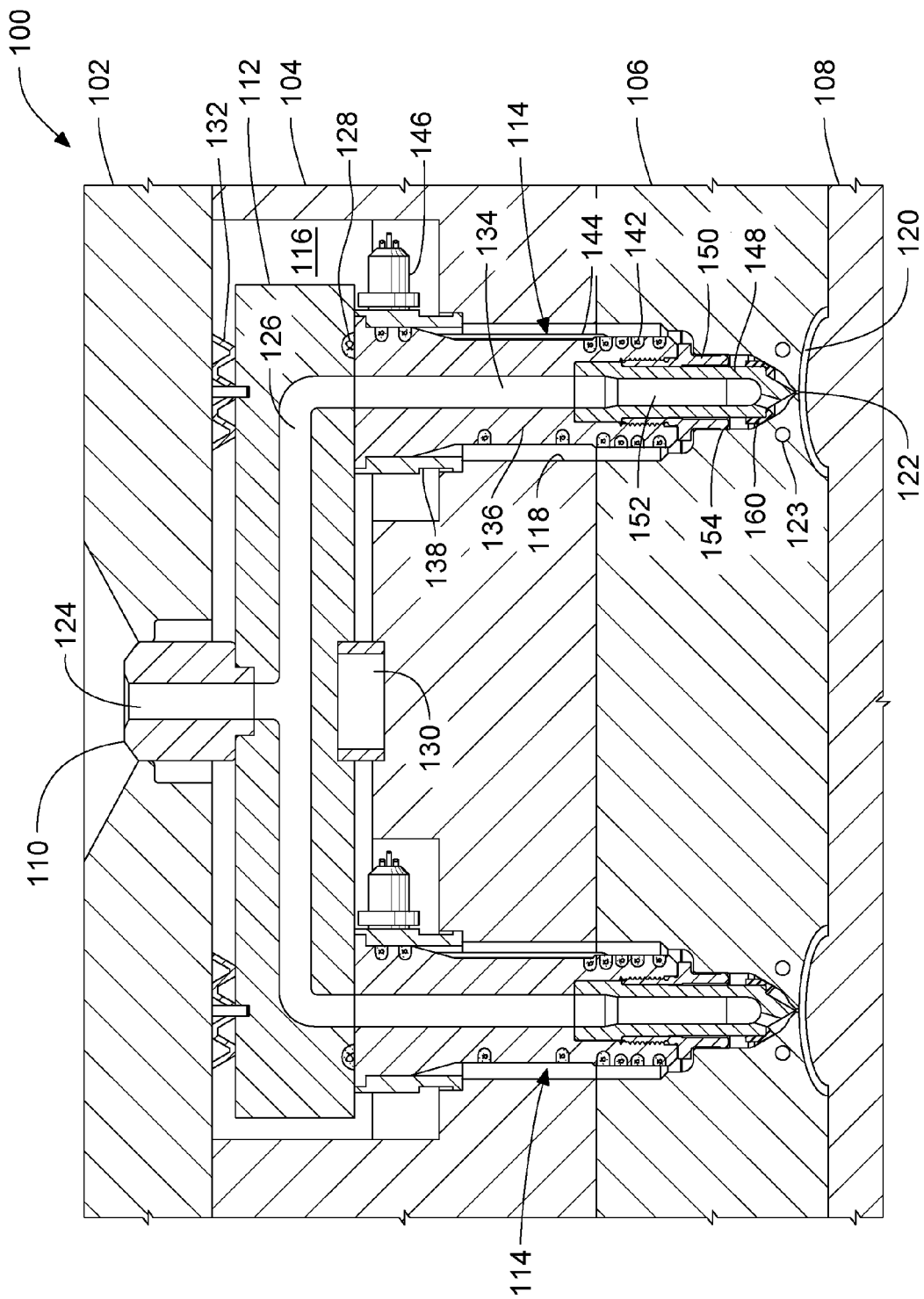
FIG. 1 is a cross-sectional view of an injection molding apparatus according to an embodiment of the present invention.

FIG. 1 shows an injection molding apparatus 100 according to an embodiment of the present invention. The features and aspects described for the other embodiments can be used accordingly with the present embodiment.

The injection molding apparatus includes a backing plate 102, a mold plate 104, a cavity plate 106, a core plate 108, an inlet component 110, a manifold 112, and a plurality of nozzles 114. The injection molding apparatus 100 may include any number of manifolds and nozzles, in any configuration. In this embodiment, one manifold is shown for simplicity. The injection molding apparatus 100 may include additional components, such as plates, alignment dowels, mold gate inserts, and cooling channels, among others.

The backing plate 102 partially defines an air space 116 and has a central opening that accommodates the inlet component 110. The mold plate 104 has a pocket that further defines the air space 116 for accommodating the manifold 112 and partially defines wells 118 for accommodating the nozzles 114. The cavity plate 106 (mold component) further defines the wells 118, partially defines mold cavities 120, and defines mold gates 122 leading into the mold cavities 120. Bolts (not shown) are generally used to sandwich the plates together. There are many configurations of backing plate 102, mold plate 104, and cavity plate 106, and the shapes and sizes of these plates may be varied. The particular number of plates used is not significant, and more or fewer plates than shown may be used.

The core plate 108 further defines mold cavities 120, in which injection molded products are formed. The core plate 108 can be separated from the cavity plate 106 to eject such products. As with the cavity plate 106, the design of the core plate 108 may be varied. The cavity plate 106 has one or more cooling channels 123 for circulating cooling fluid. The core plate 108 may include cooling channels (not shown) as well.

The inlet component 110 includes an inlet channel 124 for receiving molding material (e.g., plastic melt) from a source, such as a plasticizing screw of an injection molding machine (not shown).

The manifold 112 defines a manifold channel 126 and includes a manifold heater 128. The branching manifold channel 126 receives molding material from the inlet channel 124 and distributes the molding material to the nozzles 114. The manifold heater 128 can be of any design, such as the embedded insulated resistance wire illustrated. The manifold 112 is thermally insulated by the air space 116 defined by the surrounding plates. The manifold 112 is offset from the mold plate 104 by the nozzles 114 and a locating ring 130, which also locates the manifold 112 in the correct position. The manifold 112 is offset from the backing plate 102 by pressure discs 132, which can elastically deform to absorb differential thermal expansion of the manifold 112 and nozzles 114 with respect to the plates 102, 104.

The nozzles 114 are coupled to the manifold 112 and seated in the wells 118 by the pressure discs 132. Air in the wells 118 serves to insulate the nozzles 114 from the surrounding plates. Each nozzle 114 is associated with a mold gate 122 and defines a nozzle channel 134 in communication with the manifold channel 126 for delivering flowing molding material to the mold gate 122. Each nozzle 114 includes a nozzle body 136, a nozzle flange 138 for supporting the nozzle body 136 in the well 118, a nozzle heater 142 embedded in the nozzle body 136, a thermocouple 144, a terminal end 146 for routing wiring of the heater 142 and thermocouple 144, a nozzle tip 148, and a tip retainer 150 for removably coupling the nozzle tip 148 to the nozzle body 136. The nozzle heater 142 can be of any design, such as the embedded insulated resistance wire illustrated. The nozzle body 136 defines a channel that forms the nozzle channel 134 along with a tip channel 152 of the nozzle tip 148. The tip retainer 150 is threaded to the nozzle body 136 and includes a circumferential sealing surface 154 for sealing off the well 118 against backflow of molding material. The nozzles 114 in combination with the manifold 112 may be referred to as a hot runner.

A seal piece 160 is provided at the nozzle tip 148. In this embodiment, the seal piece 160 acts as a primary seal against leakage of molding material into the well 118, while the circumferential sealing surface 154 of the tip retainer 150 acts as a secondary or backup seal against further leakage into the well 118. The seal piece 160 need not be designed as a leak-proof seal, and may be mainly used for one or more of its other characteristics described below. In another embodiment, the sealing surface 154 of the tip retainer 150 is omitted.

Figure 2:
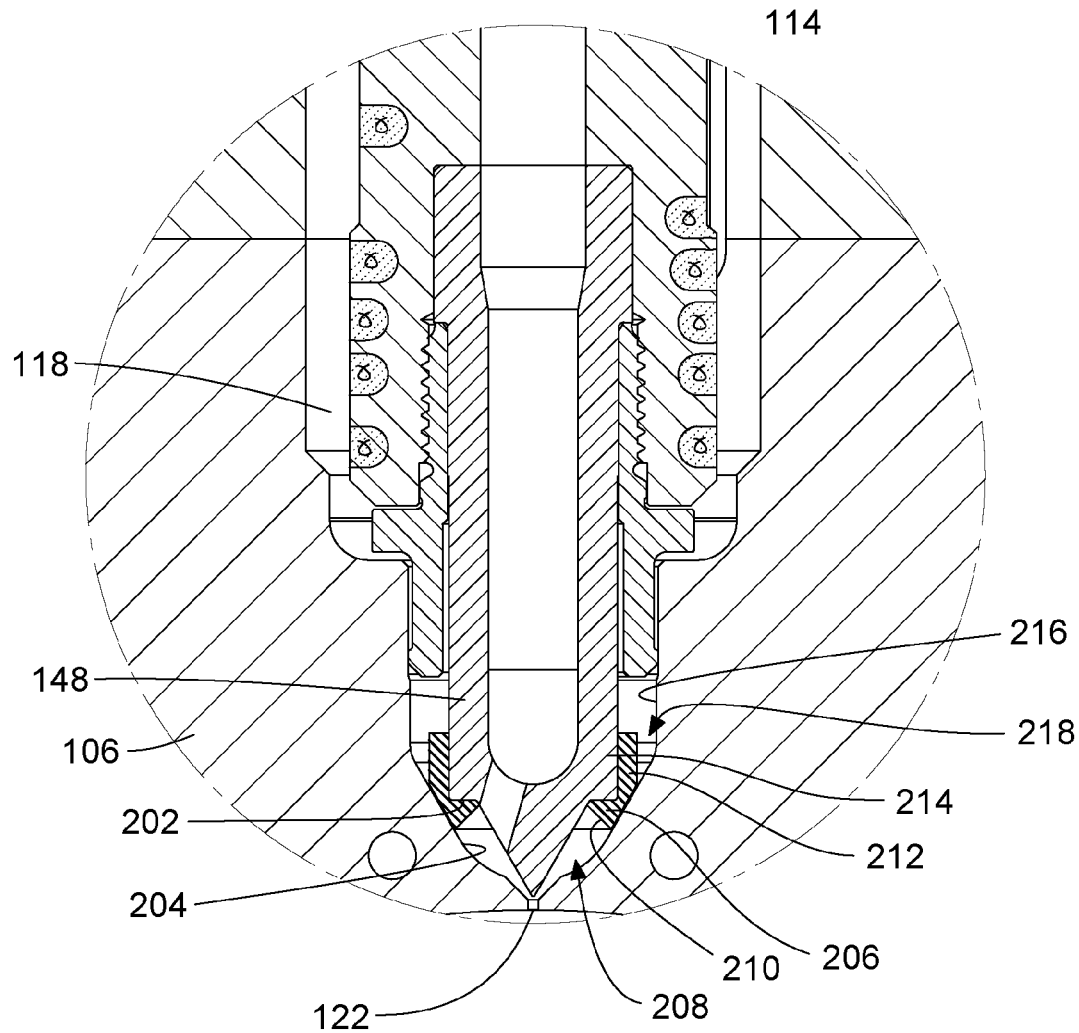
FIG. 2 is a cross-sectional view in the vicinity of the seal piece of FIG. 1.

FIG. 2 shows a close-up view of the injection molding apparatus 100 in the vicinity of the seal piece 160.

A surface 202 of the nozzle tip 148 is shaped to define a converging gap with a nearby surface 204 of the cavity plate 106 when the nozzle tip 148 is inserted into the cavity plate 106 during use, as depicted. Specifically, the lines or curves defining the surfaces 202, 204 in this cross-sectional view converge at a point. In this embodiment, the surface 202 of the nozzle tip 148 is annular and generally normal to the direction of flow of molding material, and the surface 204 of the cavity plate 106 is generally frusto-conical.

The seal piece 160 has a wedge or wedge-like portion 206 disposed between the nozzle tip 148 and the cavity plate 106. Pressure of molding material located in a bubble area 208 near the mold gate 122 acts on a flow-facing surface 210 of the wedge portion 206 and tends to wedge the wedge portion 206 into the converging gap defined by the surfaces 202, 204. This positive wedging or jamming action assists in forming a leak-resistant seal. That is, as pressure of the molding material increases, so too does the sealing effect. In this embodiment, under molding pressures, the seal piece 160, and mainly the wedge portion 206 thereof, is in direct contact with the nozzle tip 148 and with the cavity plate 106.

In terms of three-dimensional geometry, the wedge portion 206 of the seal piece 160, when revolved around the longitudinal axis of the nozzle, defines an annular ring portion having at least two converging surfaces that mate with the surfaces 202, 204.

The seal piece 160 also has a retaining portion 212 that fits onto a generally cylindrical portion 214 of the nozzle tip 148. The retaining portion 212 acts to hold the seal piece 160 onto the nozzle tip 148, specifically during assembly when the nozzle 114 is not yet inserted into the cavity plate 106. In this embodiment, the retaining portion 212 is distanced from an inside cylindrical wall 216 of the mold component, as evident by gap 218.

In this embodiment, contact force between the retaining portion 212 of the seal piece 160 and the cylindrical portion 214 of the nozzle tip 148 is designed to exceed a sticking force between the seal piece 160 and the cavity plate 106. The potential magnitude of the sticking force is reduced by the gap 218. The result is that when the nozzle 114 is brought out of the well 118, such as during maintenance, the seal piece 160 remains on the nozzle tip 148 rather than staying lodged in the well 118. This contact force can be achieved by fitting the retaining portion 212 of the seal piece 160 to the cylindrical portion 214 of the nozzle tip 148 using a press fit, friction fit, interference fit, or similar. The fit may be loose enough to allow the seal piece 160 to be removable from the nozzle tip 148, such that the seal piece 160 can be easily replaced, but still tight enough to resist the sticking force. In some configurations, this kind of fit is achievable by hand. In addition, because of the angle of the flow-facing surface 210, any solidified molding material in the bubble area 208 may also help retain the seal piece 160 on the nozzle tip 148.

In this embodiment, the seal piece 160 is of unitary or one-piece construction and the portions 206, 212 described above are defined portions of the same piece. In other embodiments, a seal piece can be of multi-piece constriction, with portions being separate subcomponents.

In this embodiment, the seal piece 160 is made of non-metallic material, and more specifically, made entirely of polyimide (such as that sold under the trademarks PLAVIS or VESPEL, for example). The tip 148 is made of beryllium-copper or another metal suitable for injection molding, which means that the material of the seal piece 160 is less thermally conductive than the material the nozzle tip 148. Thus, the seal piece 160 acts to thermally insulate the nozzle tip 148 against heat loss to the typically cooler cavity plate 106, which is made of a metal, such as steel.

Polyimide typically has a compressive modulus of elasticity in the range of 2,000 to 3,500 MPa (~300,000-500,000 psi) at ambient temperatures (which are generally also mold assembly temperatures), depending on filler content. This relatively low stiffness can increase the sealing effect, as molding material pressure forces the relatively compressible wedge portion 206 against the relatively stiff nozzle tip 148 and cavity plate 106. Stiffer materials may be used for the seal piece 160, as long as any change in sealing effect is taken into account.

Other materials suitable for the seal piece 160, or at least the wedge portion 206 thereof, include thermoset materials, ceramics, and metal-ceramic composites. In another embodiment, the seal piece 160 comprises material that is less stiff than material of the nozzle tip 148 and that has a compressive modulus of elasticity less than 10,000 MPa (1,450,000 psi) at mold assembly temperature.

In other embodiments, the seal piece 160 contacts a mold component other than a cavity plate. Such mold components include a mold plate, a mold gate insert, and a mold gate and cavity insert.

With reference back to FIG. 1, a method of injection molding is now described.

First, at least one nozzle 114 is installed into the injection molding apparatus 100, which may be further assembled with additional components to form a mold.

Next, pressurized molding material is injected into the inlet component 110. The molding material flows in a downstream direction through the heated manifold 112 and nozzles 114, to the mold gates 122, and into the mold cavities 120. Molding material acts on the flow-facing surface 210 of the wedge portion 206 to wedge the wedge portion 206 into the converging gap between the nozzle tip 148 and the cavity plate 106 (or other mold component) to seal against leakage of molding material.

Then, after molding material in the mold cavities 120 is cooled to solidify, the core plate 108 is withdrawn from the cavity plate 106 to open the mold and the finished products are ejected, thus completing one cycle of a series.

The above method also applies to the other embodiments described herein. Any omitted steps are known.

Figure 3:
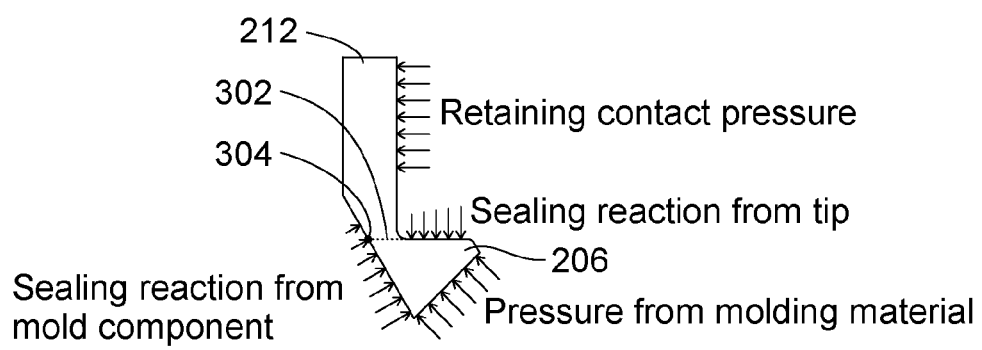
FIG. 3 is a free body diagram of a cross-section of the seal piece.

FIG. 3 is a free body diagram of a portion of the cross-section of the seal piece 160. A dotted line 302 demarcates the retaining portion 212, above, from the wedge portion 206, below. As can be seen, the cross-sectional shape of the wedge portion 206 is approximately triangular.

Horizontal arrows indicate a retaining contact pressure cause by the fit of the retaining portion 212 of the seal piece 160 onto cylindrical portion 214 of the nozzle tip 148. The retaining contact pressure is radially balanced with itself and has a magnitude at least in part due to the stiffness of the retaining portion 212 and the geometry of the fit. Using a stiffer material for the retaining portion 212 or increasing the interference of the fit would tend to increase the retaining contact pressure, and thus decrease the chance that the seal piece 160 becomes inadvertently disengaged from the nozzle tip 148.

Angled arrows indicate molding material pressure acting on the flow-facing surface 210 to urge the wedge portion 206 into the converging gap. Sealing reaction pressures at the contact with the nozzle tip 148 and the cavity plate 106 balance the molding material pressure.

The intensities and distributions of the pressures shown are illustrative and may differ depending on the specific design and operating conditions. For example, the sealing reaction pressure from the mold component may not extend to the retaining portion 212 as illustrated.

Also shown in FIG. 3 is a point of convergence 304 where the edges indicating the converging surfaces 202, 204 meet. As can be seen, the point of convergence 304 is opposite the flow-facing surface 210, with the bulk of the wedge portion 206 being located between.

Figure 4:
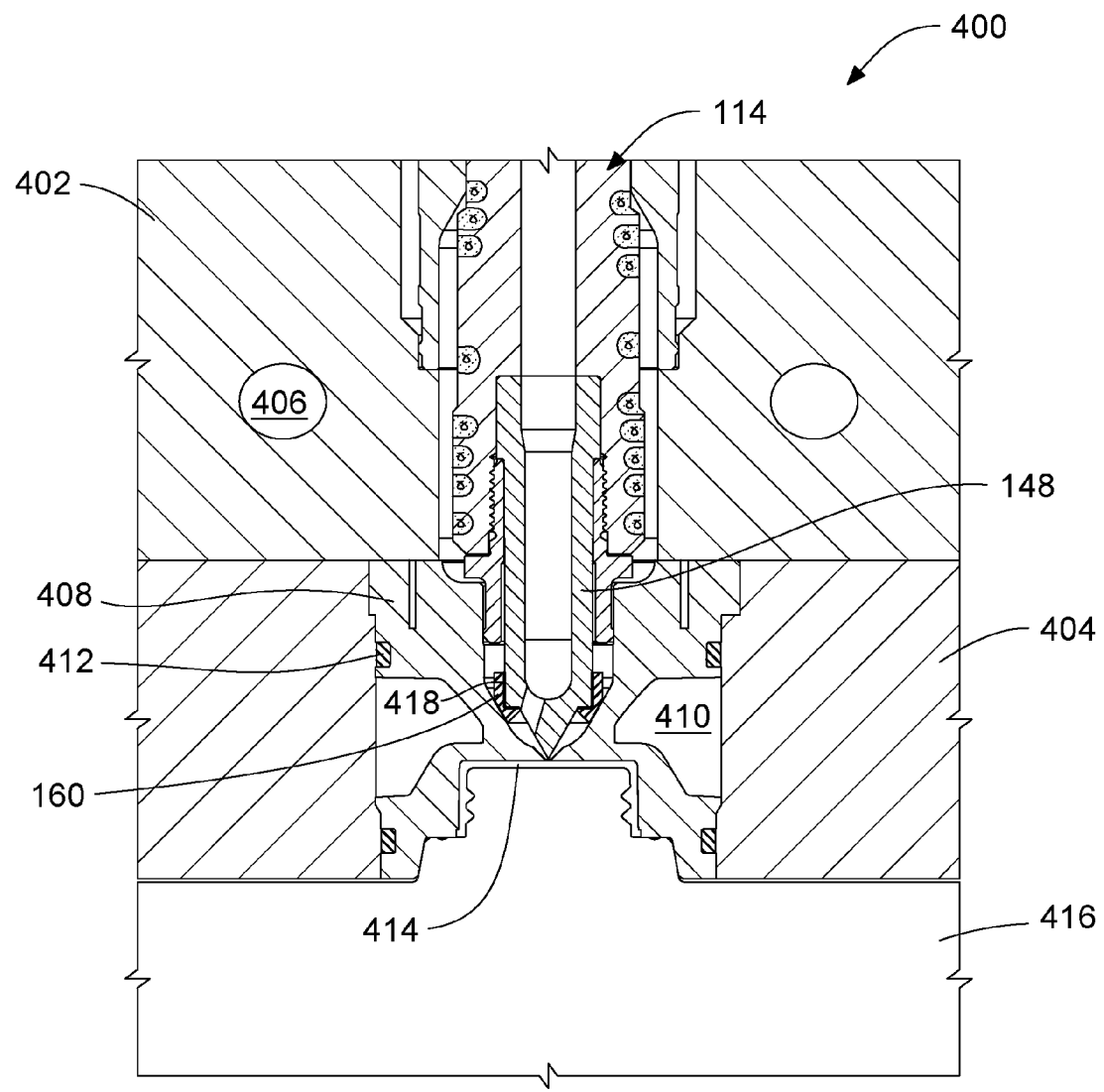
FIG. 4 is a cross-sectional view of an injection molding apparatus having a seal piece used in conjunction with a cooled gate and cavity insert.

FIG. 4 shows an injection molding apparatus 400 having a seal piece used in conjunction with a cooled gate and cavity insert according to another embodiment of the present invention. The features and aspects described for the other embodiments can be used accordingly with the present embodiment. The description given for the other embodiments can be referenced for like parts in this embodiment.

The injection molding apparatus 400 includes nozzles 114 (one shown) disposed in an arrangement of mold plates 402, 404. The mold plate 402 has a cooling channel 406 for circulating coolant.

A mold gate and cavity insert 408 (mold component) is inserted into an opening in the mold plate 404. The mold gate and cavity insert 408 defines a cooling channel 410 that is sealed with o-rings 412 and is for circulating coolant. The mold gate and cavity insert 408 defines a mold cavity 414 in conjunction with a core-side 416 (not hatched).

In this embodiment, the mold cavity 414 defines a closure (or cap) for a bottle. The core-side 416 includes known cooling structures and an ejection mechanism, whose details are omitted.

The nozzle 114 includes the seal piece 160 as described in other embodiments. Because of the proximity of the cooling channel 410 to the relatively hot nozzle tip 148, the thermal insulative characteristic of the seal piece 160 may become more important to maintain desired molding conditions.

A coating 418 may be disposed between the nozzle tip 148 and the seal piece 160 and may be used to further tune thermal conductivity or enhance the fit of the seal piece 160 on the nozzle tip 148. The coating 418 may be applied to the nozzle tip 148, to the seal piece 160, or to both. The coating 418 can be a ceramic coating disposed via physical vapor deposition (PVD), for example.

Figure 5:
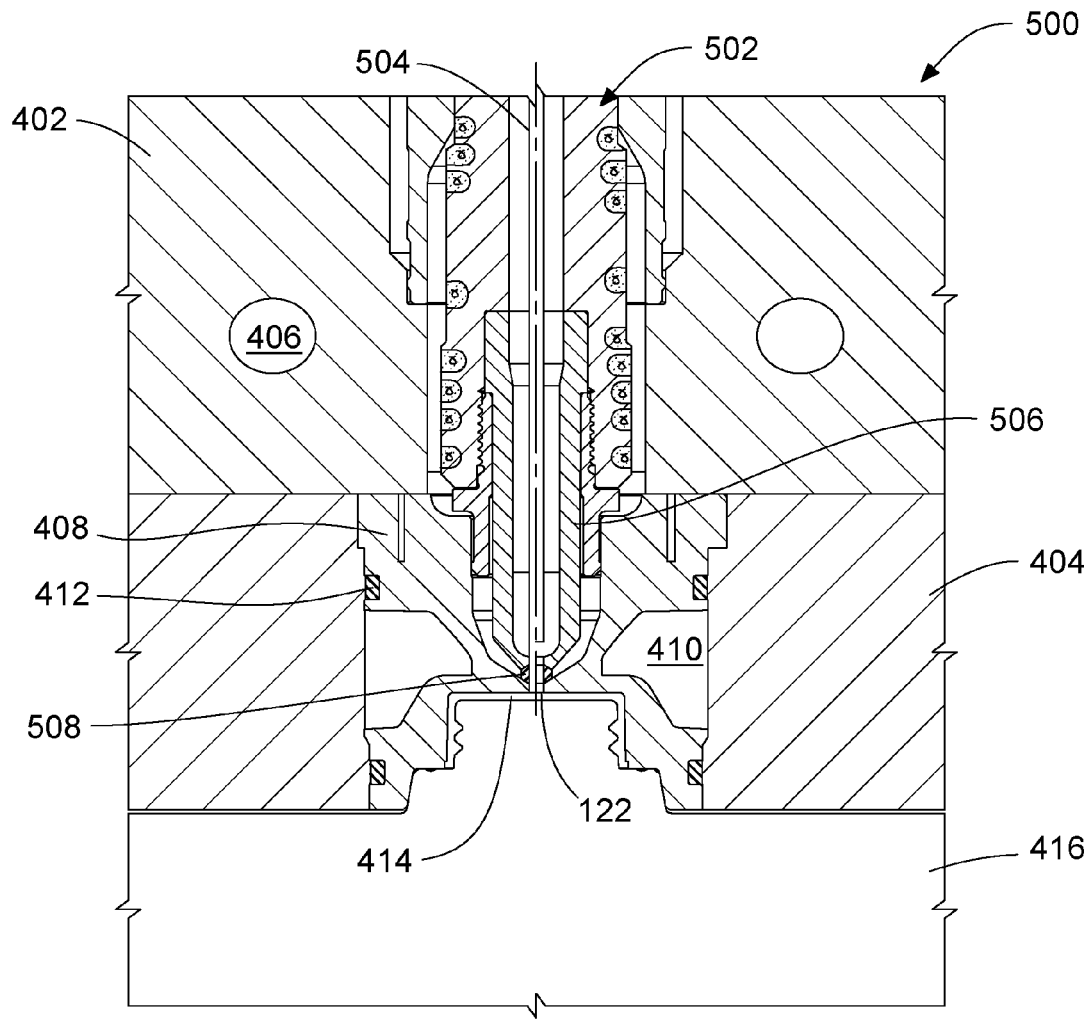
FIG. 5 is a cross-sectional view of a valve-gated injection molding apparatus.

FIG. 5 shows a valve-gated embodiment of the present invention. The features and aspects described for the other embodiments can be used accordingly with the present embodiment. The description given for the other embodiments can be referenced for like parts in this embodiment.

An injection molding apparatus 500 includes a nozzle 502. The nozzle 502 includes many of the same components provided for the nozzle 114 and further includes a valve pin 504, a nozzle tip 506 adapted for use with the valve pin 504, and a seal piece 508 disposed on the down-stream end of nozzle tip 506.

For convenience, the valve pin 504 is illustrated in both closed and open positions, with closed being shown on the left of the longitudinal axis of the nozzle 502 and open on the right. The valve pin 504 can be actuated up and down using an actuator (not shown) to open and close the mold gate 122.

The nozzle tip 506 has a downstream opening through which the valve pin 504 moves and mold material flows.

The seal piece 508 is an annular ring having a generally trapezoidal cross-section. The entire seal piece 508 is a wedge portion. The seal piece 508 is adhered to the nozzle tip 506 (e.g., by using cement, epoxy, high-temperature adhesive, or the like) to prevent the seal piece 508 from becoming lodged in the mold gate and cavity insert 408. The thermal conductivity of the seal piece 508 can be selected to meet molding requirements. For example, the seal piece 508 may be made of a material having a lower thermal conductivity than that of the nozzle tip 506.

Figure 6:
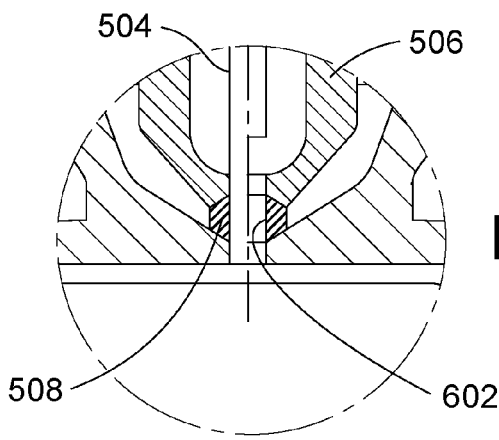
FIG. 6 is a cross-sectional view in the vicinity of the seal piece of FIG. 5.

FIG. 6 shows a close-up view of the seal piece 508. A flow-facing surface 602 of the seal piece 508 is exposed to pressure of the molding material when the valve pin 504 is open. Such pressure serves to wedge the seal-piece 508 into the converging gap defined between the nozzle tip 506 and the mold gate and cavity insert 408 to effect sealing when the valve pin 504 is open. Additionally, the seal piece 508 may be sized to allow forceful contact of the cylindrical outside surface of the valve pin 504 against the flow-facing surface 602 to promote a similar wedging action when the valve pin 504 is closed.

As mentioned above, the features aspects of the embodiments can be intermixed to arrive at additional embodiments. The following are some examples. The seal piece 160 can be adhered to the nozzle tip 148. The seal piece 508 can be provided with a retaining portion for fitting onto a correspondingly shaped portion of the nozzle tip 506. Different wedge-shaped cross-sections can be used. Triangular and trapezoidal are examples, and any cross-sectional shape having polygonal and/or curved edges with two or more converging sides that allow for wedging action to occur can be used. In addition, the material(s), including coatings, used to construct any of the seal pieces can be selected from any materials suitable for use in injection molding.

In any of the embodiments above, the nozzle tip can be coupled to the nozzle body by being integral with the nozzle body. Any of the seal pieces described herein can be used with such a one-piece construction.

In addition, although the embodiments described herein are directed to hot runner nozzles, the present invention applies equally to nozzles for other kinds of injection molding, such as thermoset injection molding, molten metal injection molding, and cold runner injection molding.

Although many embodiments of the present invention have been described, those of skill in the art will appreciate that other variations and modifications may be made without departing from the spirit and scope thereof as defined by the appended claims. All patents and publications discussed herein are incorporated in their entirety by reference thereto.

What is claimed is:

1. An injection molding nozzle, comprising:
   a nozzle body defining a channel for flow of molding material;
   a nozzle tip coupled to the nozzle body, the nozzle tip shaped to define a converging gap with a mold component into which the nozzle tip is inserted during use; and
   a seal piece having a wedge portion disposed between the nozzle tip and the mold component, wherein pressure of molding material acting on a surface of the wedge portion wedges the wedge portion into the converging gap, wherein the seal piece comprises material having a compressive modulus of elasticity less than 10,000 MPa, at mold assembly temperature.

2. The injection molding nozzle of claim 1, wherein the seal piece is non-metallic.

3. The injection molding nozzle of claim 1, wherein the seal piece comprises material that is less thermally conductive than material of the nozzle tip.

4. The injection molding nozzle of claim 1, wherein the seal piece comprises thermoset material.

5. The injection molding nozzle of claim 1, wherein the seal piece comprises polyimide.

6. The injection molding nozzle of claim 1, wherein the seal piece comprises ceramic.

7. The injection molding nozzle of claim 1, wherein the seal piece comprises metal-ceramic composite.

8. The injection molding nozzle of claim 1, wherein the seal piece comprises material that is less stiff than material of the nozzle tip.

9. The injection molding nozzle of claim 1, wherein the seal piece comprises material having a compressive modulus of elasticity in a range of 2,000 to 3,500 MPa, at mold assembly temperature.

10. The injection molding nozzle of claim 1, wherein the seal piece further comprises a retaining portion that fits onto the nozzle tip to hold the seal piece onto the nozzle tip during assembly.

11. The injection molding nozzle of claim 10, wherein the retaining portion is distanced from an inside cylindrical wall of the mold component during use.

12. The injection molding nozzle of claim 1, wherein the wedge portion of the seal piece is an annular ring having a cross-section that has at least two converging edges.

13. The injection molding nozzle of claim 12, wherein the cross-section is triangular.

14. The injection molding nozzle of claim 12, wherein the cross-section is trapezoidal.

15. The injection molding nozzle of claim 1, wherein the seal piece is in direct contact with the nozzle tip and with the mold component.

16. The injection molding nozzle of claim 1, wherein the seal piece is removable from the nozzle tip.

17. The injection molding nozzle of claim 1, wherein the seal piece is adhered to the nozzle tip.

18. The injection molding nozzle of claim 1, further comprising a coating disposed between the nozzle tip and the seal piece.

19. The injection molding nozzle of claim 18, wherein the coating is applied to the nozzle tip.

20. The injection molding nozzle of claim 18, wherein the coating is applied to the seal piece.

21. The injection molding nozzle of claim 1, wherein the mold component is selected from the group consisting of a cavity plate, a mold plate, a mold gate insert, and a mold gate and cavity insert.

22. An injection molding nozzle, comprising:
    a nozzle body defining a channel for flow of molding material;
    a nozzle tip coupled to the nozzle body, the nozzle tip shaped to define a converging gap with a mold component into which the nozzle tip is inserted during use; and
    a seal piece disposed between the nozzle tip and the mold component, the seal piece comprising a retaining portion that fits onto a cylindrical portion of the nozzle tip to hold the seal piece onto the nozzle tip during assembly, the seal piece further comprising an annular ring portion having at least two converging surfaces, wherein pressure of molding material acting on a flow-facing surface of the annular ring portion urges the converging surfaces against surfaces defining the converging gap wherein the annular ring portion is disposed on a first side of the converging gap and the retaining portion is disposed on a second side of the converging gap opposite the first side.

23. The injection molding nozzle of claim 22, wherein the seal piece comprises non-metallic material that is less thermally conductive than material of the nozzle tip.

24. A method of injection molding, comprising the steps of:
    installing a nozzle into a mold, the nozzle comprising a seal piece having a wedge portion disposed between a nozzle tip and a mold component, wherein the seal piece comprises material having a compressive modulus of elasticity less than 10,000 MPa, at mold assembly temperature;
    injecting pressurized molding material through the nozzle and into a mold cavity defined by the mold;
    the molding material acting on a surface of the wedge portion to wedge the wedge portion into a converging gap between the nozzle tip and the mold component to seal against leakage of molding material; and
    opening the mold and ejecting solidified molding material from the mold cavity.

25. The injection molding nozzle of claim 22, wherein the retaining portion is press fit, friction fit, or interference fit onto the cylindrical portion of the nozzle tip.

26. The injection molding nozzle of claim 22, further comprising a gap between the retaining portion and the mold component.

27. The injection molding nozzle of claim 22, wherein retaining portion provides a contact force between the retaining portion and the cylindrical portion, and wherein the contact force is greater than a sticking force between the seal piece and the molding component.

* * * * *